United States Patent
Kozarekar et al.

(10) Patent No.: US 8,894,526 B2
(45) Date of Patent: *Nov. 25, 2014

(54) POWERTRAIN FOR A HYBRID ELECTRIC VEHICLE

(71) Applicant: Ford Glboal Technologies, LLC, Dearborn, MI (US)

(72) Inventors: Shailesh S. Kozarekar, Novi, MI (US); Edward W. Haran, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/691,963

(22) Filed: Dec. 3, 2012

(65) Prior Publication Data

US 2014/0155211 A1 Jun. 5, 2014

(51) Int. Cl.
*F16H 37/08* (2006.01)
*F16H 37/06* (2006.01)

(52) U.S. Cl.
CPC .......... *F16H 37/0806* (2013.01); *F16H 37/065* (2013.01)
USPC .......................................................... 475/5

(58) Field of Classification Search
None
See application file for complete search history.

(56) References Cited

U.S. PATENT DOCUMENTS

| | | | |
|---|---|---|---|
| 5,558,595 A * | 9/1996 | Schmidt et al. | 477/3 |
| 5,775,449 A | 7/1998 | Moroto et al. | |
| 5,788,006 A | 8/1998 | Yamaguchi | |
| 5,839,533 A | 11/1998 | Mikami et al. | |
| 5,899,286 A | 5/1999 | Yamaguchi | |
| 6,407,521 B1 | 6/2002 | Raftari et al. | |
| 6,427,794 B1 | 8/2002 | Raftari et al. | |
| 6,603,215 B2 | 8/2003 | Kuang et al. | |
| 7,093,912 B2 | 8/2006 | Brown et al. | |
| 7,128,677 B2 * | 10/2006 | Supina et al. | 475/5 |
| 7,175,555 B2 | 2/2007 | Kozarekar et al. | |
| 7,576,501 B2 | 8/2009 | Okubo et al. | |
| 7,678,003 B2 | 3/2010 | Janson et al. | |
| 7,694,762 B2 | 4/2010 | Supina et al. | |
| 2002/0023790 A1 | 2/2002 | Hata et al. | |
| 2002/0153727 A1 | 10/2002 | Takenaka et al. | |
| 2004/0121870 A1 | 6/2004 | Takenaka et al. | |
| 2008/0078591 A1 | 4/2008 | Schondorf et al. | |
| 2010/0029429 A1 | 2/2010 | Ota | |
| 2013/0012347 A1 * | 1/2013 | Ortmann et al. | 475/5 |

* cited by examiner

*Primary Examiner* — Robert A Siconolfi
*Assistant Examiner* — Huan Le
(74) *Attorney, Agent, or Firm* — David B. Kelley; MacMillan, Sobanski & Todd, LLC

(57) ABSTRACT

A vehicle powertrain including a planetary transmission including an output, a first member connected an a first power source and a second member connected to a second power source, a brake for alternately releasing the output and holding the output against rotation, a motor including a second output driveably connected to vehicle wheels, and a clutch for opening and closing a drive connection between the output and the vehicle wheels.

11 Claims, 1 Drawing Sheet

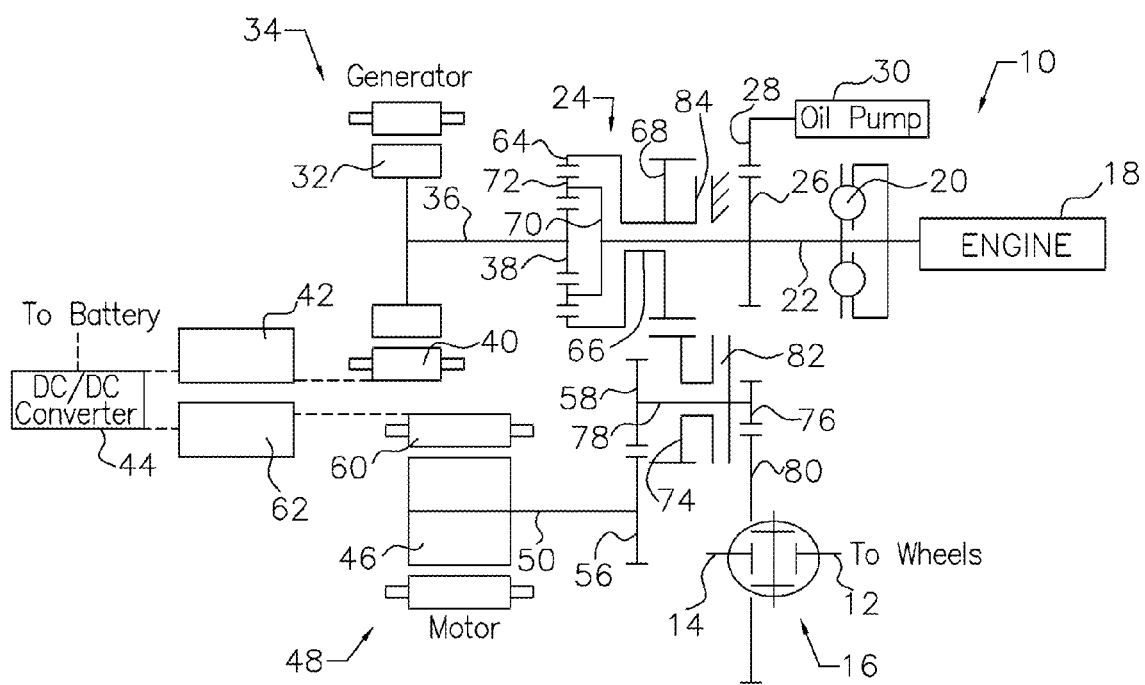

POWERTRAIN FOR A HYBRID ELECTRIC VEHICLE

BACKGROUND OF THE INVENTION

1. Field of the Invention

This invention relates generally to a powertrain for a hybrid electric vehicle, especially a plug-in electric vehicle.

2. Description of the Prior Art

In a hybrid electric vehicle equipped with a powersplit transmission, the traction motor and motor-generator are driveably connected to the driven vehicle wheels. Hence, the speed of the traction motor is always proportional to the wheel speed, and motor-generator speed is proportional to wheel speed and engine speed. The generator speed is highest, for a given vehicle speed, when the engine is off.

Similarly, the speed of the planet pinion is also proportional to the vehicle speed, and engine speed and is highest, for a given vehicle speed, when the engine is off.

Hence, the maximum allowable planetary pinion speed & generator speed determine the maximum allowable electric vehicle drive speed.

When a plug-in hybrid electric vehicle operates in charge-depleting mode, energy flows from an electric storage battery through the traction motor to the vehicle wheels. Hence, the generator spins freely. However, the ability to start the engine and provide power from the engine needs to be maintained. Hence, there is a limitation on the peak electric vehicle drive speed due to conditions described above. When the speed is higher than the peak electric vehicle drive speed, the engine must be turned on and run when it is not required.

When the vehicle is being driven in electric vehicle (EV) mode, all the elements such as generator & planetary gear set are rotating and causing additional losses.

SUMMARY OF THE INVENTION

A vehicle powertrain including a planetary transmission including an output, a first member connected an a first power source and a second member connected to a second power source, a brake for alternately releasing the output and holding the output against rotation, a motor including a second output driveably connected to vehicle wheels, and a clutch for opening and closing a drive connection between the output and the vehicle wheels.

A method for operating the powertrain includes driveably connecting a motor to vehicle wheels, connecting a sun gear of a transmission to a starter-generator, supporting planet pinions meshing with the sun gear and a ring gear on a planet carrier connected to an engine, engaging a brake and using the starter-generator to crank and start the engine.

The powertrain includes a powersplit transmission, which is especially suited to plug-in hybrid electric vehicle (PHEV) applications. The powertrain minimizes losses and eliminates vehicle speed constraints when operating in electric vehicle mode.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which: the FIGURE is a schematic diagram of a powertrain for hybrid electric vehicle.

DESCRIPTION OF THE PREFERRED EMBODIMENT

The FIGURE shows a powertrain 10 for a hybrid electric vehicle, whose wheels are driveably connected to the shafts 12, 14 of a differential mechanism 16. An engine 18, such as an internal combustion engine, is connected through a torsion damper 20 and shaft 22 to a planetary transmission 24. Shaft 22, a pinion 26 and gear 28 transmit power to an oil pump 30.

The rotor 32 of an electric starter-generator 34 is connected by a shaft 36 to the sun gear 38 of transmission 24. The stator 40 of electric starter-generator 34 is electrically connected to a generator inverter 42, which is electrically connected through a DC/DC converter 44 to an electric storage battery.

Similarly, the rotor 46 of an electric traction motor 48 is connected by a shaft 50 to a pinion 56, which meshes with a gear 58. The stator 60 of electric motor 48 is electrically connected to a motor inverter 62, which is electrically connected through the DC/DC converter 44 to the electric storage battery.

Transmission 24 includes a ring gear 64 connected through a sleeve shaft 66 to a pinion 68, a carrier 70 connected to shaft 22, and a set of planet pinions 72 supported for rotation on the carrier and meshing with the ring gear 64 and sun gear 38. Pinion 68 meshes with transfer gear 74.

Gear 58 and final drive pinion 76 are supported on a countershaft 78. A final drive gear 80, meshing with pinion 76, is connected to the input of differential 16.

A clutch 82 releasably connects transfer gear 74 to countershaft 78. When clutch 82 is disengaged, ring gear 64 and the transfer gear 74 are disconnected from countershaft 78, thereby separating the axis of engine 18 and generator 34 from the axis of the motor 48 and eliminating rotation losses and drag.

A brake 84 releasably holds pinion 68 and ring gear 64 against rotation by selectively connecting them to a case or another stationary component. When brake 84 is applied, rotating power produced by the starter-generator 34 is transmitted through transmission 24 at a reduced speed, through shaft 22 to crank engine 18. In this way engine 18 can be started and run at any time independently of the speed of motor 48.

Clutch 82 and brake 84 may be hydraulically actuated friction devices, or mechanically/hydraulically actuated synchronizers.

In accordance with the provisions of the patent statutes, the preferred embodiment has been described. However, it should be noted that the alternate embodiments can be practiced otherwise than as specifically illustrated and described.

The invention claimed is:

1. A vehicle powertrain, comprising:
   a planetary gearset including an output rotatably fixed relative to a ring gear, a planet carrier connected to a first power source and the ring gear connected to a second power source;
   a brake for selectively releasing and holding the output against rotation;
   a motor including a second output continuously driveably connected to vehicle wheels through a countershaft;
   a clutch, having a first portion rotatably fixed on the countershaft and a second portion rotatably fixed relative to the ring gear via a pinion, the clutch selectively opening and closing a drive connection between the output and the vehicle wheels.

2. The vehicle powertrain of claim 1, further comprising:
a transfer gear supported on the countershaft and meshing with the pinion;
a differential producing a drive connection between the countershaft and the vehicle wheels;
wherein the clutch opens and closes a drive connection between the transfer gear and the differential.

3. The vehicle powertrain of claim 1, further comprising:
a second pinion connected to the second output;
a gear secured to the countershaft and meshing with the second pinion;
a differential producing a drive connection between the countershaft and the vehicle wheels;
wherein the clutch opens and closes a drive connection between a transfer gear and the differential.

4. The vehicle powertrain of claim 1, further comprising:
a transfer gear supported on the countershaft and meshing with the pinion;
a second pinion connected to the second output;
a gear secured to the countershaft and meshing with the second pinion;
a differential producing a drive connection between the countershaft and the vehicle wheels;
wherein the clutch opens and closes a drive connection between the transfer gear and the differential.

5. A vehicle powertrain, comprising:
a transmission including a ring gear, a sun gear connected to a starter-generator, a planet carrier connected to an engine and supporting planet pinions meshing with the sun gear and ring gear;
a brake for selectively releasing and holding the ring gear against rotation;
a motor including an output continuously driveably connected to vehicle wheels through a countershaft;
a clutch, having a first portion rotatably fixed on the countershaft and a second portion rotatably fixed relative to the ring gear via a pinion, the clutch selectively opening and closing a connection between the ring gear and the vehicle wheels.

6. The vehicle powertrain of claim 5, further comprising:
a transfer gear supported on the countershaft and meshing with the pinion;
a differential producing a drive connection between the countershaft and the vehicle wheels; and
wherein the clutch opens and closes a drive connection between the transfer gear and the countershaft.

7. The vehicle powertrain of claim 5, further comprising:
a second pinion connected to the second output;
a gear secured to the countershaft and meshing with the second pinion;
a differential producing a drive connection between the countershaft and the vehicle wheels; and
wherein the clutch opens and closes a drive connection between a transfer gear and the countershaft.

8. The vehicle powertrain of claim 5, further comprising:
a transfer gear supported on the countershaft and meshing with the pinion;
a second pinion connected to a second output;
a gear secured to the countershaft and meshing with the second pinion;
a differential producing a drive connection between the countershaft and the vehicle wheels; and
wherein the clutch opens and closes a drive connection between the transfer gear and the countershaft.

9. A method for operating a vehicle powertrain, comprising:
continuously driveably connecting a motor to vehicle wheels through a countershaft;
connecting a sun gear of a transmission to a starter-generator;
supporting planet pinions meshing with the sun gear and a ring gear on a planet carrier connected to an engine;
using a clutch, having a first portion rotatably fixed on the countershaft and a second portion rotatably fixed to the ring gear via a pinion, to disconnect the ring gear from the vehicle wheels;
engaging a brake to hold the ring gear against rotation and using the starter-generator to start the engine.

10. The method of claim 9, further comprising:
engaging the clutch;
disengaging the brake; and
transmitting power produced by one of the engine and the starter-generator through the transmission and the clutch to the vehicle wheels.

11. The method of claim 9, further comprising:
disconnecting a torque path between the ring gear and the vehicle wheels by disengaging the clutch.

* * * * *